United States Patent [19]

Carlman, Jr. et al.

[11] Patent Number: 4,777,488

[45] Date of Patent: Oct. 11, 1988

[54] RESTAURANT SERVICE REQUEST COMMUNICATIONS SYSTEM

[75] Inventors: Philip L. Carlman, Jr., Beverly; Robert K. Waite, Jr., Groton, both of Mass.

[73] Assignee: CW Products, Inc., Beverly, Mass.

[21] Appl. No.: 864,291

[22] Filed: May 16, 1986

[51] Int. Cl.⁴ .................. H04Q 7/00; H04B 1/16; G05B 23/02

[52] U.S. Cl. .................. 340/825.72; 340/825.69; 340/825.08; 455/73; 455/343

[58] Field of Search .................. 340/825.08, 825.44, 340/825.07, 825.19, 311.1, 825.17, 825.69, 825.72; 455/73, 127, 343

[56] References Cited

U.S. PATENT DOCUMENTS

| | | |
|---|---|---|
| 1,919,007 | 7/1933 | Chase . |
| 2,978,676 | 4/1961 | Spencer .................. 340/825.08 |
| 3,854,127 | 12/1974 | Damon . |
| 3,866,206 | 2/1975 | De Giorgio et al. . |
| 3,991,412 | 11/1976 | Hillberg . |
| 4,019,139 | 4/1977 | Ortega .................. 340/311.1 |
| 4,020,477 | 4/1977 | Holland . |
| 4,040,013 | 8/1977 | Carlson . |
| 4,092,599 | 5/1978 | Yee et al. .................. 340/311.1 |
| 4,544,924 | 10/1985 | French .................. 455/127 |

FOREIGN PATENT DOCUMENTS

| | | | |
|---|---|---|---|
| 0012502 | 6/1980 | European Pat. Off. ....... 340/825.08 |
| 58-42331 | 3/1983 | Japan .................. 340/311.1 |
| 2080001 | 1/1982 | United Kingdom ............ 340/311.1 |

*Primary Examiner*—Benedict V. Safourek
*Assistant Examiner*—Ralph E. Smith
*Attorney, Agent, or Firm*—Henry D. Pahl, Jr.

[57] ABSTRACT

In the service request communication system disclosed herein, a plurality of battery-powered table units communicate a variety of service requests to a central server or master unit by a bi-directional wireless radio frequency data link. The table units remain in a low-power "sleep" state until any one of a plurality of switches is actuated by a customer to denote a corresponding service request. A transceiver is controlled by a microprocessor to transmit a coded signal identifying the request and then to receive and indicate to the customer an acknowledgment signal transmitted from the server or master station. At a server station a display is operated to identify the table unit/request combination, the display being canceled when a corresponding switch at the server unit is actuated, e.g. by the employee who will provide the service requested.

4 Claims, 9 Drawing Sheets

RESTAURANT SERVICE REQUEST COMMUNICATIONS SYSTEM

BACKGROUND OF THE INVENTION

The present invention relates to a restaurant service request system, more particularly to a system which utilizes a bi-directional wireless radio frequency data link to communicate a variety of service requests from table units to a server or master unit and to acknowledge the reception of a request back to the table unit which originated the request.

While various hard-wired annunciator systems have been utilized in the past for communicating a simple request for service from restaurant customers to a central location, such systems have not found widespread acceptance because of the high cost of installing wiring and the limited utility and reliability of such systems. While radio frequency data link systems have been used in various high technology and security environments, the technologies utilized have not been suitable for, and have therefore not suggested themselves for, utilization in the context of restaurant service request communications.

Among the several objects of the present invention may be noted the provision of a service request communications system for use in a restaurant environment; the provision of such a system which permits the communication of a variety of requests to a server unit or station, the provision of such a system which acknowledges to the restaurant customer that his request was received by the server unit; the provision of such a communication system which does not require the installation of wiring to individual restaurant tables, the provision of such a system which is highly reliable and which is yet of relatively simple and inexpensive construction. Other objects and features will be in part apparent and in part pointed out hereinafter.

SUMMARY OF THE INVENTION

Briefly, the present invention relates to a restaurant service request communications system utilizing a plurality of remote units and at least one server/master units. The remote units communicate with server/master units by means of microprocessor controlled radio frequency transceivers. The remote units are battery powered and the microprocessor in each remote is normally maintained in a lower "sleep" state. Each remote includes a plurality of manually actuable switch elements by means of which a patron can enter his request. A display is provided for indicating that a request has been received and acknowledged by a server/master. The actuation of any switch element triggers initial operation or "powering up" of the remote unit microcomputer, the reading of the switch status and transmission of a coded request identifying the particular remote unit/switch element combination. Following the transmission, the transceiver is controlled to listen for an acknowledgement code and, if a predetermined acknowledgement code is received, the display is correspondingly energized.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1A:
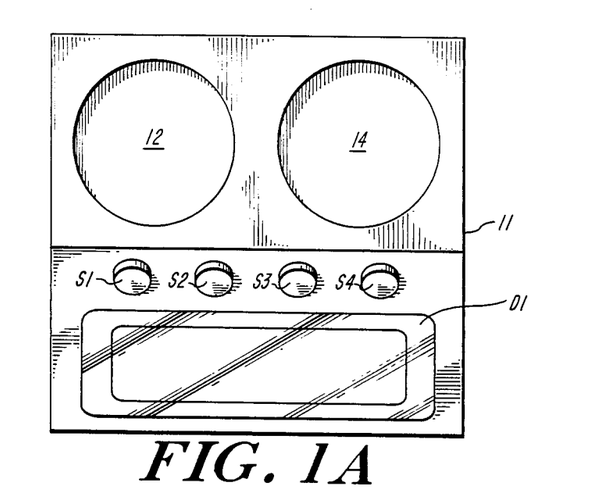
FIGS. 1A, 1B, and 1C are top, side and front views, rspectively, showing the physical arrangement of a remote or table unit employed in a restaurant service request communication system constructed in accordance with the present invention.
Figure 1B:
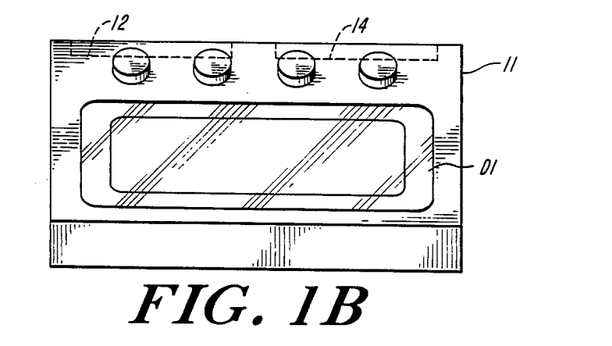
Figure 1C:
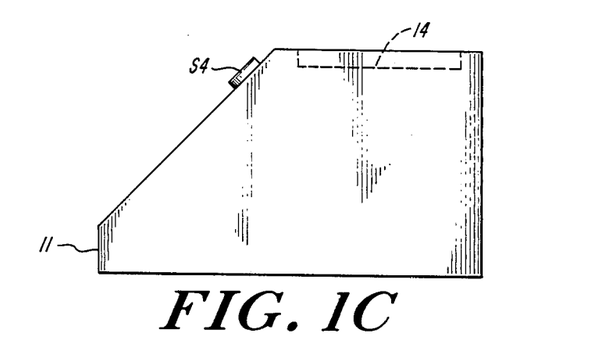

Referring now to FIG. 1, the individual remote or table unit illustrated there comprises a relatively compact case 11 which houses the transceiver and microcomputer circuitry described hereinafter, together with a rechargeable battery. The top of the case may include recesses, as indicated at 12 and 14, for holding restaurant accoutrements such as salt and pepper. On the sloped face of the unit are a series of push-button switch elements S1–S3 each of which is labeled to designate a respective service function, e.g. waiter service, check request and do not disturb. As will be understood, additional or different types of service request can be straightforwardly provided. A fourth push-button switch S4 is provided to implement a cancel function as described hereinafter. The face of the case also carries a display D1 which can be operated, as described hereinafter, to indicate to the restaurant patron that a particular service request signal has been received and acknowledged by a central service or master unit. While more complex displays can be utilized, a simple array of lamps or LEDs (light emitting diodes), one for each of the three service request switches, is presently preferred.

Figure 2:
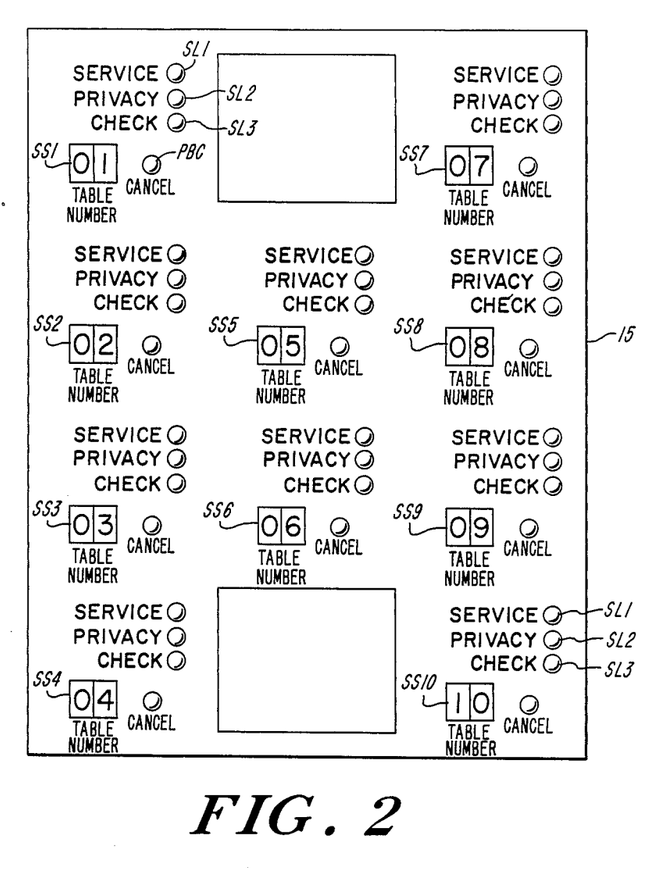
FIG. 2 is an illustration of the physical arrangement of a server unit which cooperates with a plurality of table units such as that illustrated in FIG. 1.

An appropriate physical arrangement for a server unit or situation display is illustrated in FIG. 2. The server unit comprises a relatively large wall-mountable case 15, the face of which comprises an array of display regions, one for each table which is to be served from that server unit. Each display region includes three lamps SL1–SL3, i.e. corresponding to the lamps at the respective table units, a pushbutton display cancel switch PBC, and a thumbwheel type selector switch, these selector switches being designated by reference characters SS1–SS10 in FIG. 2. Each server unit includes a radio frequency transceiver, similar to those in each of the table units, together with microcomputer circuitry for controlling the transceiver, for monitoring the state of the switches PBC and SS1–SS10, and for operating the display lamps.

As indicated previously, the present invention contemplates a restaurant service request communication system in which a plurality of table units send coded service requests by a wireless r.f. data link to a central master or server unit and the central unit sends back an acknowledgement signal which activates a display at the table unit so that the patron knows that his request has been received.

In a relatively simple implementation of the invention, a single server/master unit may accommodate a number of table units sufficient for a small establishment. However, in the preferred embodiment of the invention, a plurality of server display stations are provided and these table units and the server units are linked by a master unit through which communications are routed. In one sense, a master unit together with several server display stations can be thought of as a large master/server unit. The use of multiple server units or situation displays is advantageous in larger establishments since each request can be displayed at a server location appropriate to the nature of the request. For example, different server displays can be provided for different groups of tables and requests for cocktail service can be routed to the cocktail waitresses if they are different from the food servers.

In that the average level of data transmission is not particularly high, data communications among the various units is advantageously provided using a polled, time-slotted r.f. data link. Before describing the detailed construction of the system, it is useful to set forth the basic communications protocol. All of the various units, whether remote, server or master, use crystal controlled oscillators to establish an accurate time base so that time division utilization or "time-slotting" of a single channel r.f. data link is straightforwardly implemented. To synchronize the time bases of the various units, the master unit periodically transmits a coded "start" signal. This, in effect, initiates the "polling" of the various units making up the overall system. No unit other than the master initiates any transmission until it has received the "start" signal and has timed out the required interval between the "start" signal and the respective time slot in which it is allowed to transmit.

A typical restaurant service request scenario is as follows. The customer activates a request button at one of the remote or table units. This "wakes up" the remote unit which locks on its power and reads the request into memory. The remote unit then listens for the poll start code, and, after timing from the start code, transmits the message in its time slot to the master indicating the remote unit number, the nature of the request, and a checksum. The master, in the next poll cycle, sends an acknowledgement to the remote, and also sends messages to all of the situation display or server units indicating the table number and the request. If the remote does not receive an acknowledgement, it will re-transmit the original message until it does so. Only when the remote receives an acknowledgement from the master does it operate its display in correspondence to the activated request switch.

The situation display or server units, after they have been sent a message, individually acknowledge the message back to the master in the poll sequence. After having received a valid service request message from the master, each of the situation display units scan its table number switches SS1-SS10 and, if that table number is dialed in to any one or more of the switches, the corresponding status lamp is lit. Otherwise the message is ignored by that server unit, except for sending back its acknowledgement that the message was received.

When a service person has fulfilled a request, the request may be cancelled in two ways. From the remote, by a process essentially identical to the entering of a service request or from a server unit by activating the cancel switch (PBC) associated with the appropriate table number. This causes the server unit to insert a "cancel" message into the next poll. This message contains the table number and a checksum in addition to the cancel code. The master, on the following poll, acknowledges the message to the situation display unit, and sends a message to the remote to cancel pending requests.

Figure 3:
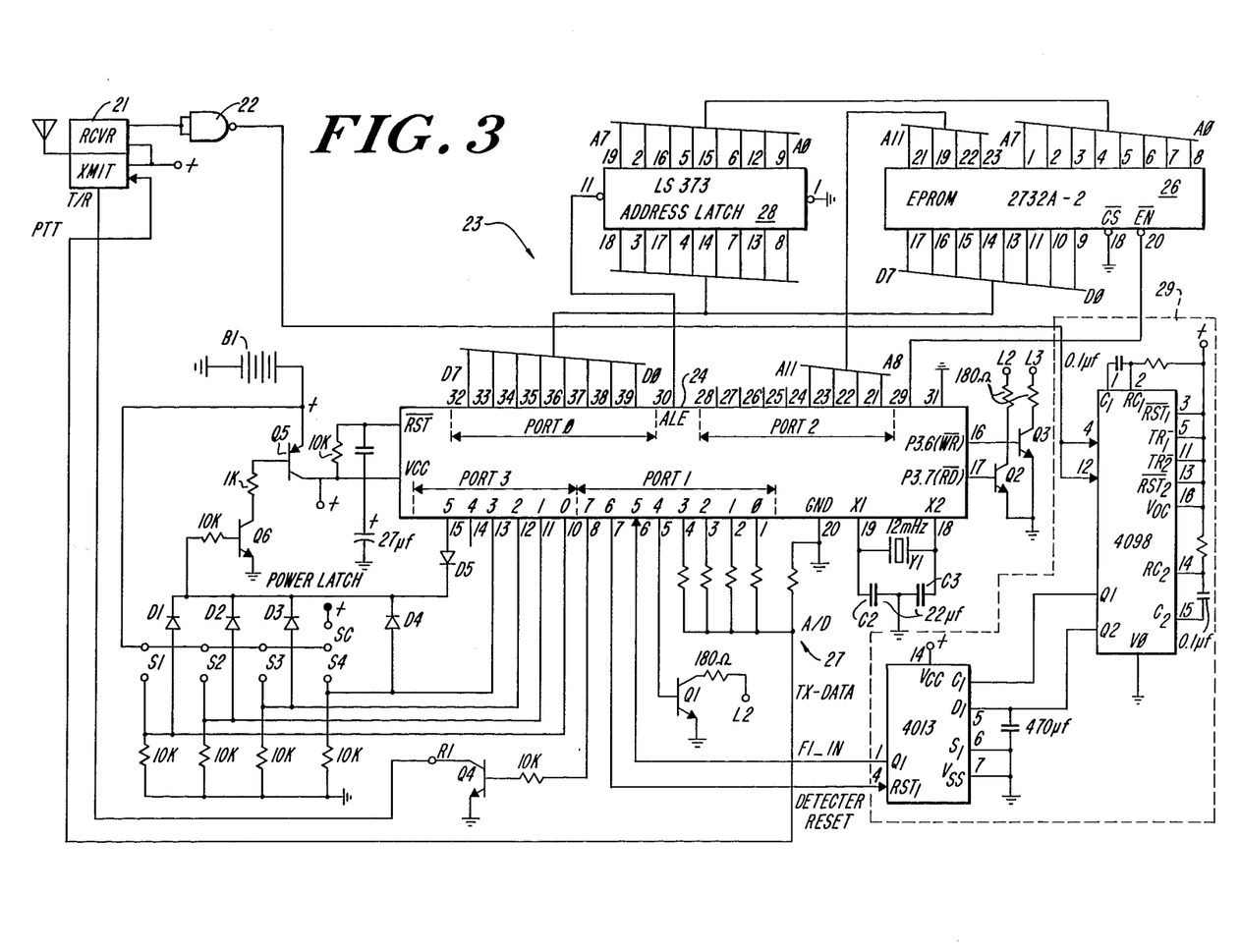
FIG. 3 is a schematic circuit diagram of a table unit of the type illustrated in FIG. 1.

Referring now to FIG. 3, the transceiver which is provided in each remote unit is indicated generally by reference character 21 and the microcomputer which is utilized for controlling the transceiver and the remote unit display is indicated generally by reference character 23. A suitable type of transceiver is that employed in the Model 49-SA communicator sold by Maxon Systems, Inc. of Kansas City, MO.

The microcomputer in the illustrated embodiment comprises a microprocessor 24 together with a separate read only memory 26 (ROM) for holding resident software (firmware). A preferred microprocessor for this application is the model 8OC31 available from the Intel Corporation of Sunnyvale, Calif. since it consumes relatively little power and provides an adequate number of input/output lines to directly implement the control functions required by the remote units of the system of the present invention. Since the 8OC31 microprocessor utilizes multiplexed addressing, a latch 28 is provided for retaining address information for the memory 26. The frequency of the timing oscillator internal to the 8OC31 microprocessor is controlled by the crystal Y1 as shown in the drawing.

One output lead of the microprocessor is used to select between the transmit and receive functions of the transceiver 21 by controlling conduction through a transistor Q4. A series of resistors having binary weighted resistances values are connected to four microcomputer output leads to implement a digital-to-analog (D/A) conversion function. This group or resistors together with the usual load resistor is indicated generally by reference character 27. The D/A function is used in generating a wave form which modulates the transmitter. The form of modulation employed is an essentially conventional frequency shift keying (FSK) modulation technique.

Tone signals picked up by the transceiver in its receive mode are converted to digital logic levels by a hysteresis type level trigger 22 and the logic level signal is applied to a narrow band tone detector indicated generally be reference character 29. Detector 29 provides a logical "true" output only when the modulation frequency of the received signal is within a preselected band. The output of the detector 29 is applied to one of the microprocessor input leads. One of the microprocessor output leads is used to reset the particular tone detector circuit used at the start of each listening session.

The state of the input switches S1-S4 are sensed by individual input leads of the microprocessor 24 in a one-to-one fashion, though it should be understood that, for more complex request systems, a matrix scanning arrangement might also be used. The display lamps are controlled from respective microprocessor output leads through respective driver transistors Q1-Q3.

As indicated previously, the transceiver 21 and microprocessor circuitry are powered by a battery, preferably rechargeable, which is self-contained within the table unit, such a battery being indicated at B1 in FIG. 3. The battery B1 is connected to the microprocessor circuitry through a transistor Q5 so that power to the microcomputer can be shut off when not needed. The transceiver and the other circuits ancillary to the microprocessor are also powered from the switched power lead though these connections are not shown in FIG. 3. Once the microcomputer is in operation, conduction through transistor Q5 is controlled by one of the microcomputer output leads through a diode D5 and a driver transistor Q6.

Initial powering-up of the microcomputer is provided by an array of diodes D1–D4 which are connected to the switch elements S1–S4. One side of each switch S1–S4 is connected to the positive side of the battery. The diodes acts as an OR gate so that when any one of the switches is actuated, power will be applied at least momentarily to the microcomputer. As part of the initial power-up routine of the microcomputer program, the lead controlling the power gating transistor is operated to latch up the supply by turning the transistor on. Similarly, when the remote unit has completed its communication and display tasks, the program can turn the transistor Q5 off, putting the microcomputer into its "sleep" mode. While the power-down or "sleep" function has been shown as being implemented by discrete separate circuitry, it should be understood that certain microprocessors incorporate within themselves circuitry for implementing essentially the same function and that such an integrated function should be understood to be equivalent to the implementation disclosed herein by way of example.

Figure 6:
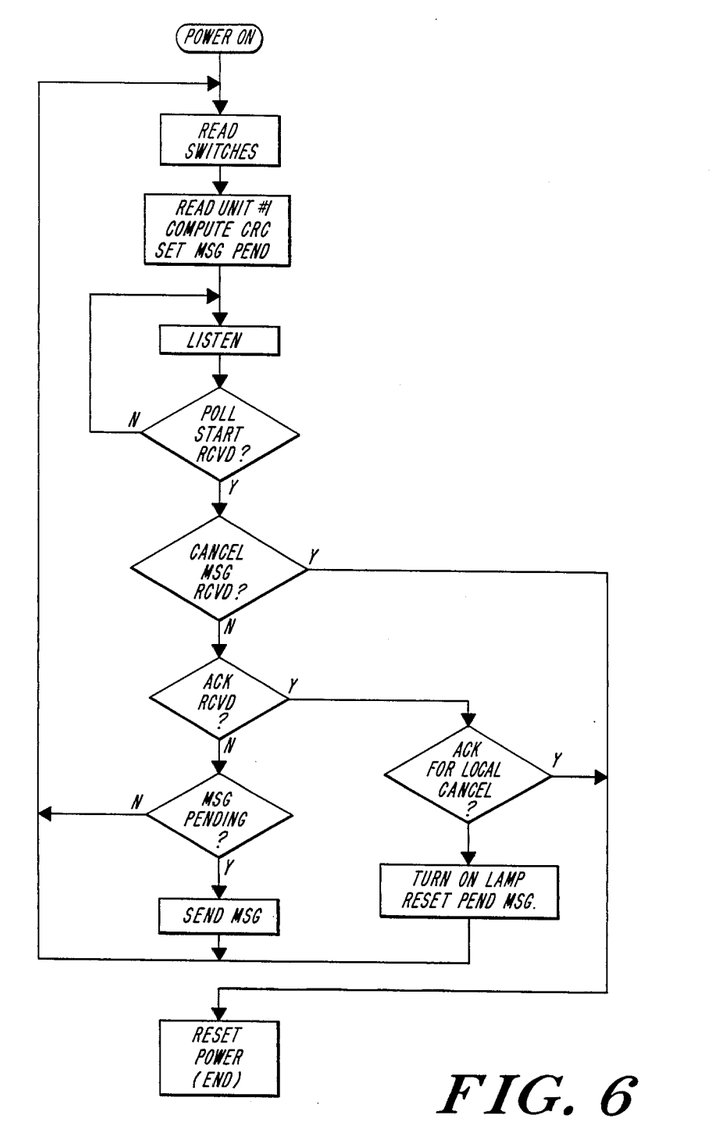
FIG. 6 is a flow chart of software employed in the circuitry of the table unit of FIGS. 1 and 3.

As indicated previously, the microcomputer incorporates read-only memory (ROM) for storing programs, so that the operating software can be understood to be inbedded or always resident in the system. The flow chart of FIG. 6 illustrates operating system software for the table unit of FIGS. 1 and 3. When power is first turned on, i.e. by the actuation of any one of the switch elements S1–S4, the first task of the program is to read the status of the switches to determine which switch was operated. The unit number, i.e. a number uniquely identifying the particular table unit so as to distinguish it from other units in the system, is then read from the appropriate location in the read-only memory. This information might also be obtained by reading a unit number selection switch. From this combination of data, a cyclic redundancy checksum (CRC) is calculated.

At this point the program operates the transceiver in the receive mode to listen for a coded "start" message which indicated the beginning of a poll sequence as noted previously. Once the "start" code is received, the microprocessor starts timing a preselected interval to reach the time slot corresponding to the respective remote unit. The remote unit also listens for messages from the master, the master being assigned the first time slot. Relevant messages from the master include acknowledgements and cancel messages. However, assuming that no such message was received, the microcomputer operates the transmitter to send a coded message which comprises the data representing the unit number, the data representing the switch which was activated, and the cyclic redundancy checksum. As is understood by those skilled in the art, the inclusion of a cyclic redundancy checksum allows the receiving unit, i.e. the master unit, to determine if a valid message has been received.

After the message has been transmitted, the program loops back and the receiver is turned on to listen to determine if an acknowledgement message is recieved. If no acknowledgement signal is received during the next poll, the program, in effect, assumes that interference has occurred and re-transmits the request message in the appropriate time slot.

Once a proper acknowledgement is received, the computer operates the remote unit display to provide an acknowledgement indication, i.e. by lighting the appropriate lamp to indicate to the restaurant customer that the service request was in fact communicated to the host and received by it. The message pending flag is also reset.

While the display is on, the remote unit continues to monitor the respective time slot with the receiver listening for a coded cancel message. Once the coded cancel message is received, the microcomputer resets the power latch 33 causing the table unit to, in effect, shut down and stop consuming power from the battery. In addition, if a remote unit's cancel switch is operated while the microprocessor is energized and a display lamp is lit, the remote unit will transmit a cancel request to the master in the remote's time slot. The energization of the microprocessor and the display lamp, however, will continue until the corresponding acknowledgement message is received from the master.

Figure 4:
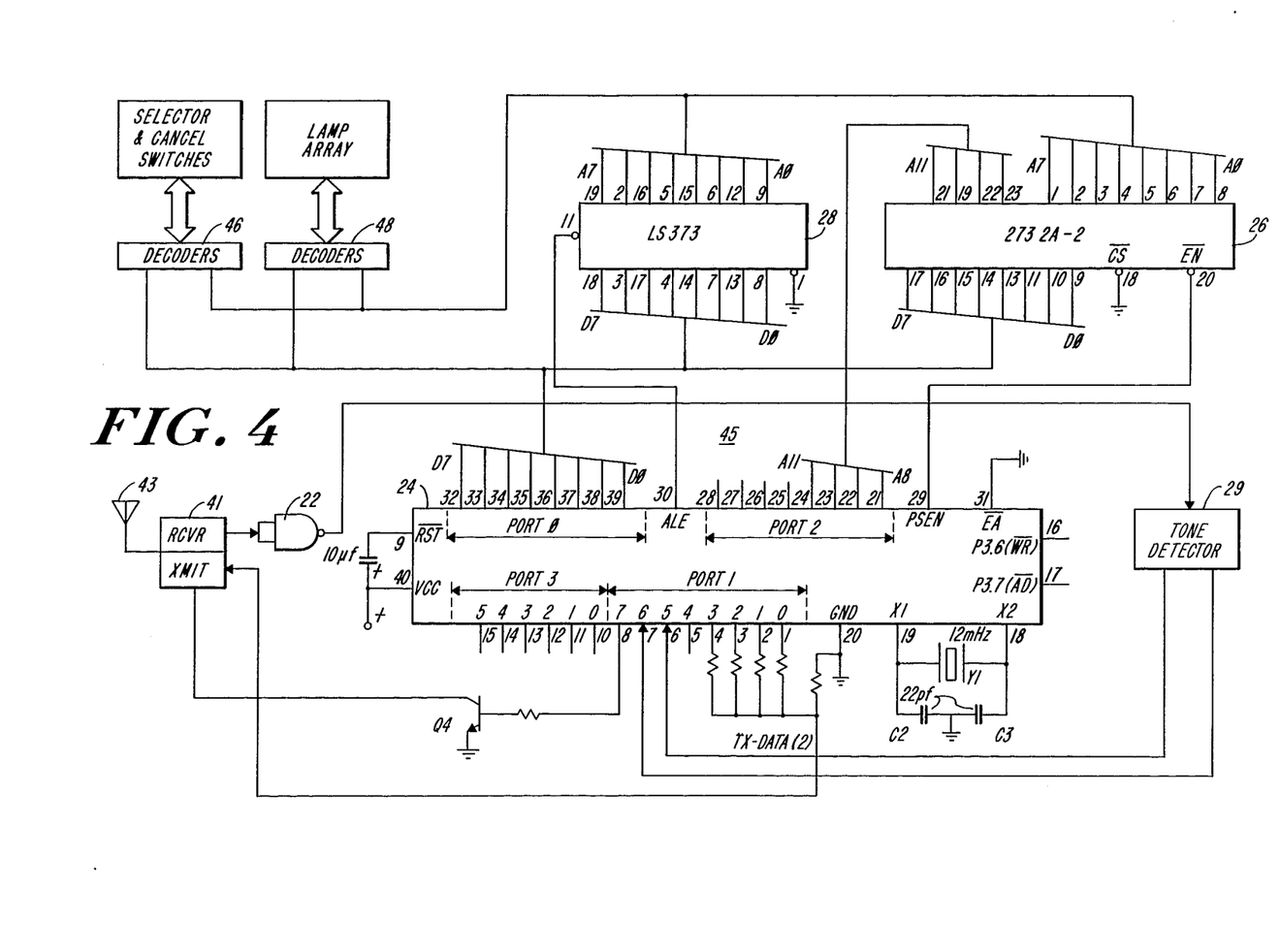
FIG. 4 is a schematic circuit diagram of a server unit of the type illustrated in FIG. 2.

Referring now to FIG. 4, the server unit circuitry illustrated there includes a transceiver 41 essentially similar to the transceiver 21 in each remote unit, a suitable antenna being indicated by reference character 43. A microcomputer 45 is included within the server unit for performing the various control functions as described hereinafter. To facilitate consistent programming, it is convenient that microprocessor 45 be either an 8031 or 80C31 though very low power operation is not required for the server unit since it will typically be powered by a line-operated power supply rather than batteries. Details of the microprocessor implementation are not discribed in detail herein insofar as they are essentially identical with the implementation in the remote units.

In order to read the relatively large number of switch contacts involved in the selector switches SS1–SS10 and request cancel switches PBC, and to operate the relatively large number of display lamps, the server unit microcomputer 45 is provided with decoding circuitry, as indicated by reference characters 46 and 48, so that the switch contacts and lamps can be scanned or multiplexed as is well understood in the art.

Figure 7A:
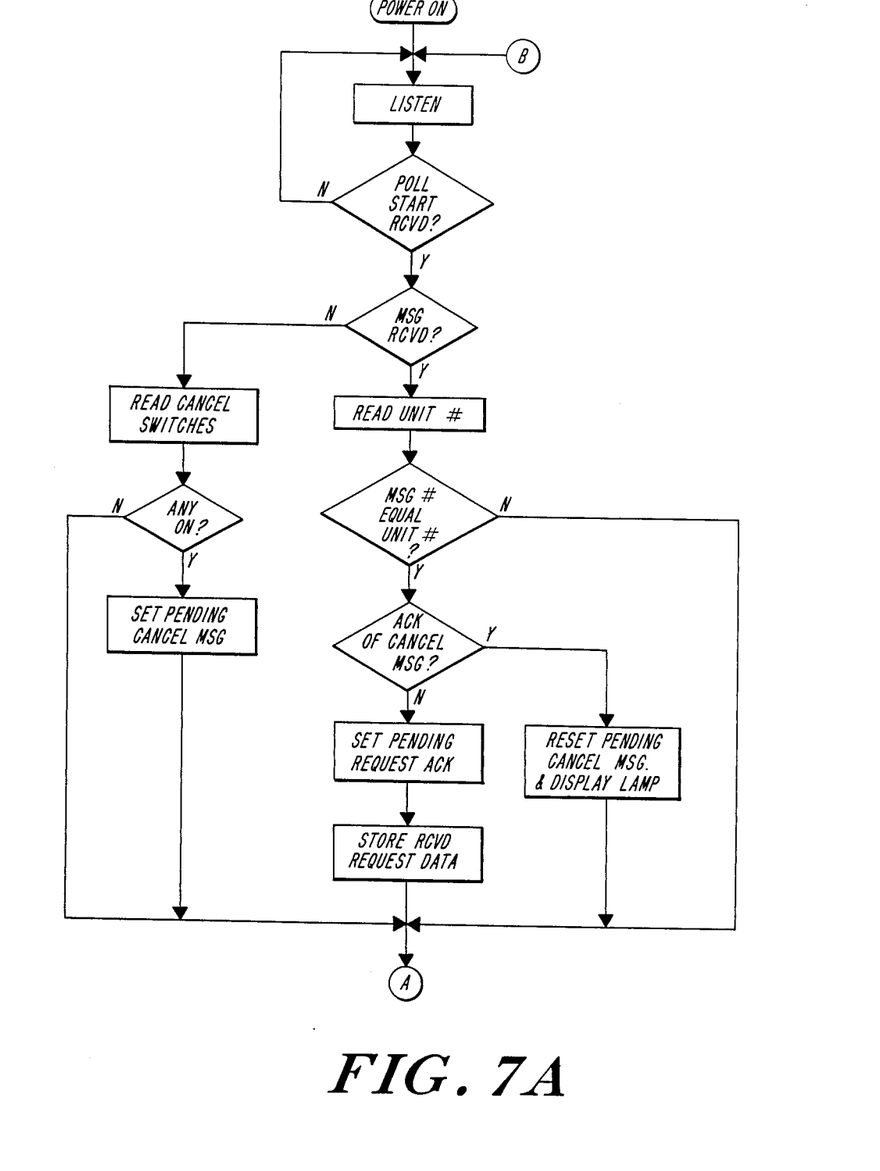
FIGS. 7A and 7B are a flow chart of software employed in the server unit of FIGS. 2 and 4.
Figure 7B:
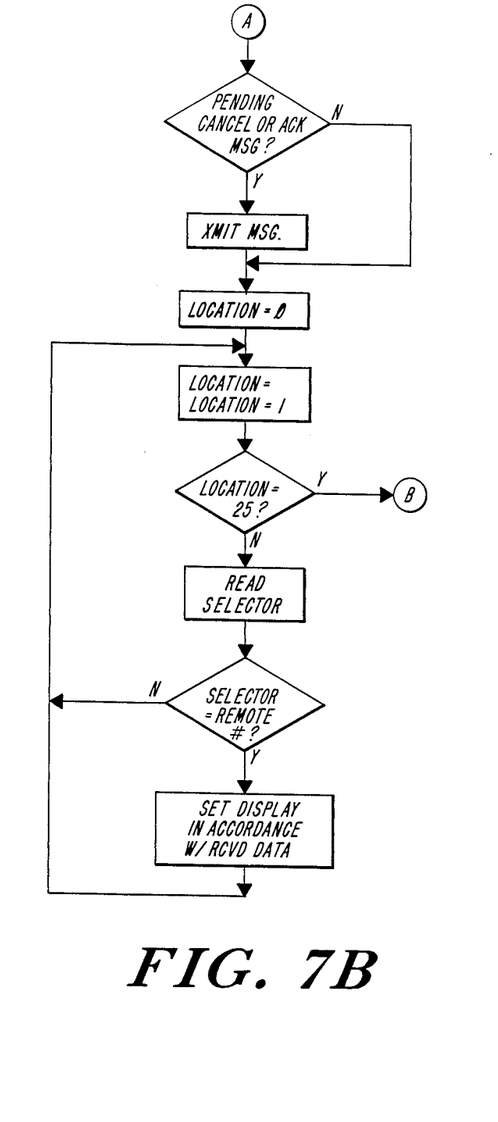

The flow chart of FIG. 7 illustrates operating system software for a server unit of the type illustrated in FIGS. 2 and 4. After powering up, the unit first listens for a "start" transmitted by the master unit to indicate the start of a poll cycle. The unit then listens, to transmissions from the master, for a message addressed to that server unit. If a service request message is received, the server unit stores the data and sets a flag to initiate transmission of an acknowledgement in the unit's time slot. In its time slot, each server unit may transmit an acknowledgement of a request received or it may initiate a cancel message as indicated previously.

Having received a message relevant to server units, each server unit then reads its selector switches (SS1–SS10) to determine if the message number which identifies the initiating remote unit, is equal to any one of the numbers set into the selector switches. If not, the message is ignored but, if there is a match, the program begins a loop which increments through its own table locations to see if there is a match between the selection switch settings and the remote which initiated the service request. If a match is found, the appropriate display lamp is set. The program assumes that the server unit may have up to 25 selector switches though only 10 have been implemented in the embodiment described. The numbers set into the selector switches may range up to 99 in the embodiment illustrated. After the last location is scanned, the program returns to the initial listening stage.

If no message directed to the server units is received, the program enters a different branch (it may be considered to be a background task) in which it reads the cancel switches PBC to determine if any one of them is being actuated. If so, the program sets a flag to initiate the transmission of a cancel message in the server units time slot. Following transmission of the cancel message, no further action is taken to actually effect cancelling of the respective display lamp until an acknowledgement from the master unit is received. If no acknowledgement is received, the cancel operation is effectively aborted for retry on another poll cycle since the pending cancel message flag is reset only after an appropriate acknowledgement is received from the master.

Figure 5:
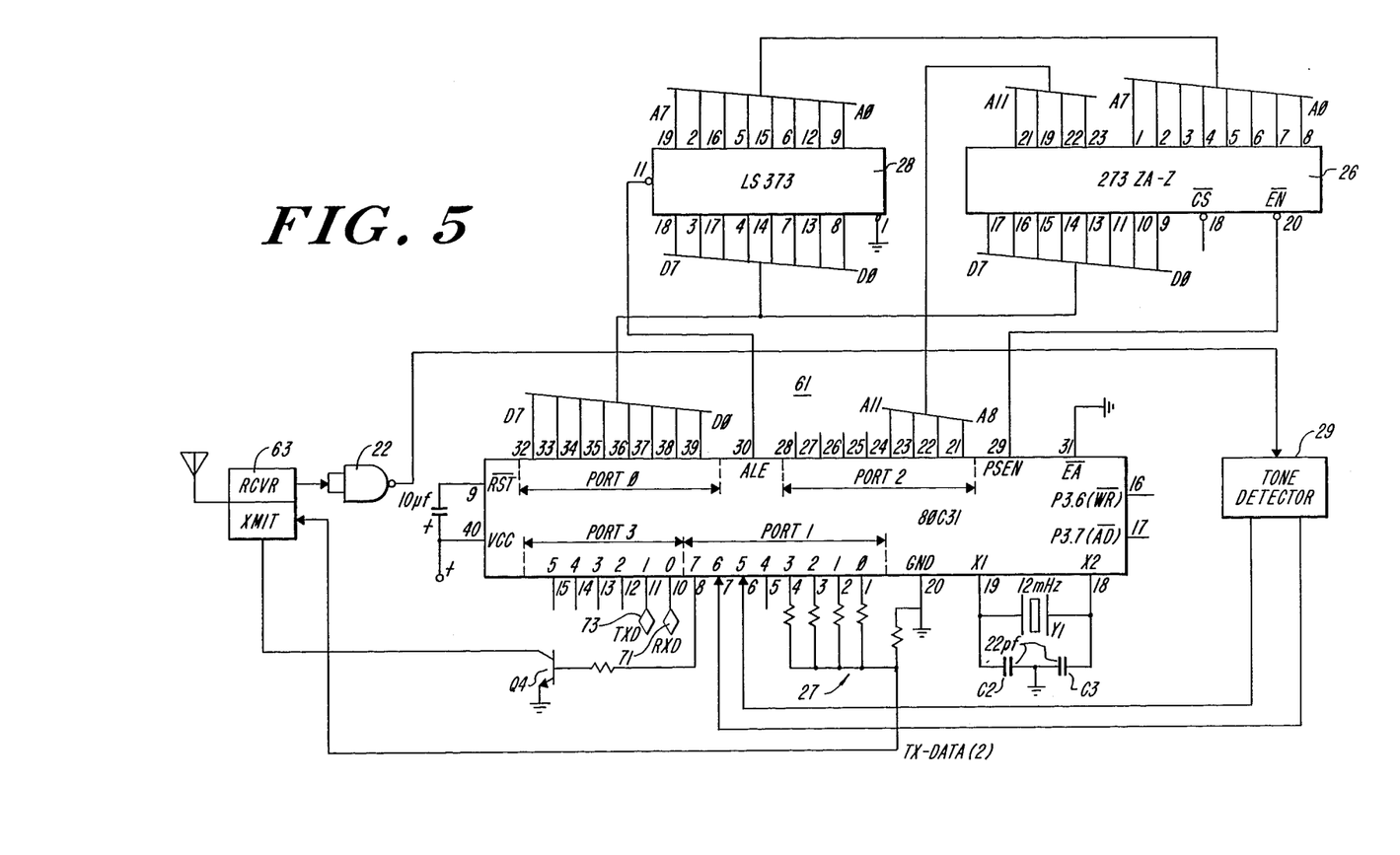
FIG. 5 is a schematic circuit diagram of a master unit which coordinates the operation of a plurality of remote and server units of the type illustrated in FIGS. 3 and 4 respectively in the operation of an overall restaurant service request communications system in accordance with the present invention.

In terms of the actual operation of the service request communications system, the function of the master unit is essentially a message coordinator. With reference to FIG. 5, the master communications microcomputer is designated generally by reference character 61. The electrical interconnections between the microcomputer 61 and the master transceiver 63 are essentially the same as the arrangements in the remote and server units and are thus not described in detail herein. The master unit essentially comprises no circuitry not in the remote and server units except that one microcomputer input lead 71 and one microcomputer output lead 73 are used to implement in hardwired serial data link for purposes described hereinafter.

As indicated previously, the function of the master unit in the actual operation of the restaurant service request communications system of the present invention is essentially that of a central communications coordinator or clearing house. The master microcomputer keeps a table for holding pending messages, accessible by unit number. Proceeding from the top of the flow chart of FIG. 8, the first task of the master unit microcomputer program is to scan through that table and, if a message or acknowledgement is pending for any unit, transmit that message or acknowledgement. These transmissions take place in the first time slot of the poll sequence. Preferably, while most of the time only a single message will need to be transmitted by the master during a given poll sequence, it may be useful in some circumstances to allow the first slot to be expandable to accommodate multiple messages from the master. In such case, the server and remote units are programmed to time out an interval to their respective time slot beginning at the end of the master's time slot (slot 0).

Figure 8:
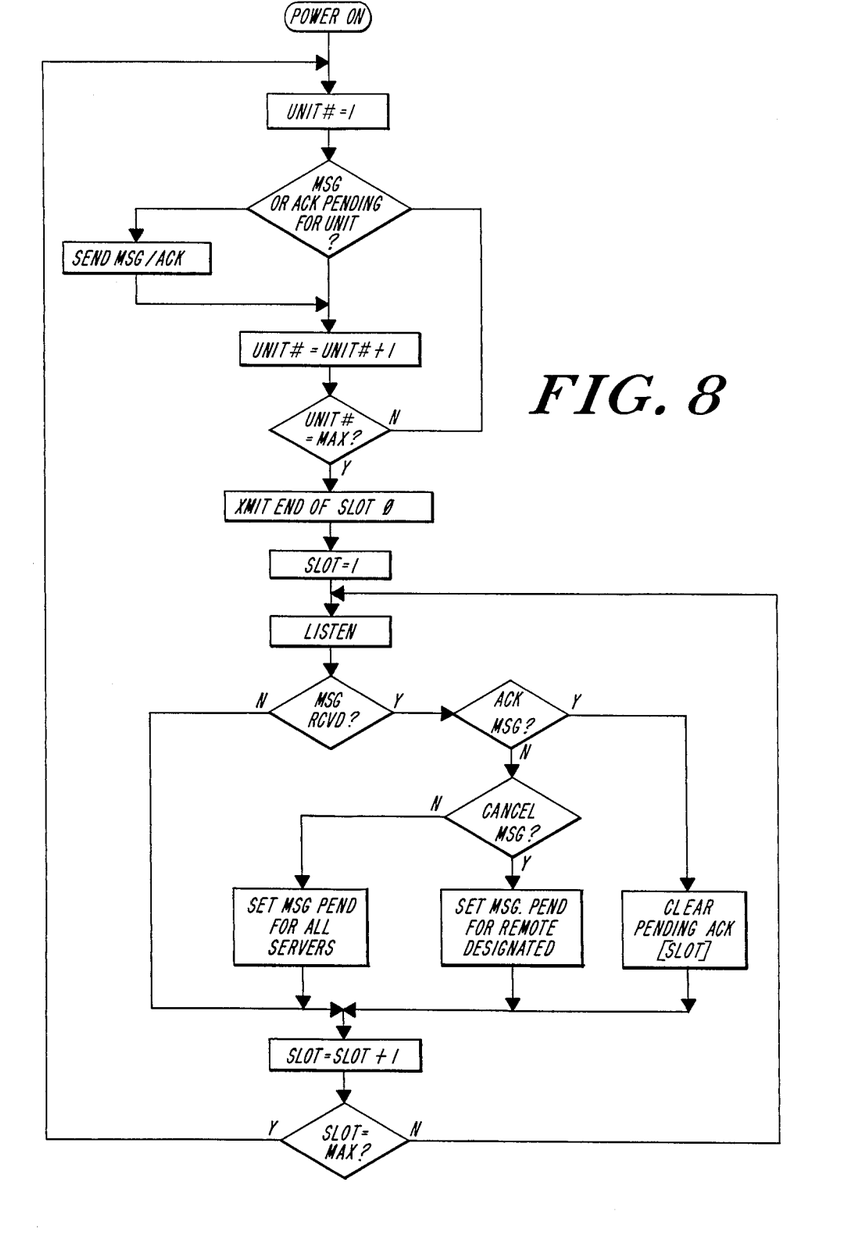
FIG. 8 is a flow chart of software employed in the master unit of FIG. 5.

At the end of its transmissions, the master unit listens in each of the successive time slots which are allocated to the various remote and server units. If a message is received, the master unit program in essence parses the message to first determine if it is an acknowledgement message. If it is, the respective pending acknowledgement flag for that slot is cleared. If the message received is not an acknowledgement, the program tests to see if it is a request cancel message. If it is, a message pending flag is set for the respective remote designated in the message. If the message received is neither an acknowledgement nor a cancel message, it is assumed to be a service request message and a message pending flag is set for all servers. As noted previously, service requests originating from any remote or table unit is sent to all server units and the server units themselves determine, from their respective selector switch settings, whether the remote unit originating with the request is one for which that server unit is responsive.

This listening and parsing continues to all possible slots until the maximum slot number is reached at which point the program loops back to begin another polling cycle.

For restaurant management purposes, it may also be useful to provide a central display which essentially duplicates the several server unit displays. It is also useful for management purposes to provide data identifying the service requests and the responses thereto to a logging system which records those events and can correlate them into meaningful management reports.

As the master unit carries the heaviest data communications load, it is presently preferred that the computational load associated with operating a central display or logging be provided by a display controller system, i.e. another microcomputer system to which the master communications microcomputer provides display data just as it does to the server units. This data communication, however, is preferably provided over a simple, hardwired serial data link. With reference to FIG. 5, the serial data link is implemented by the microprocessor leads 71 and 73.

As indicated previously, the preferred embodiment described herein provides for a plurality of server display units. However, for smaller establishments, a single server display may be sufficient and the communications functions of the master may be subsummed therein. Similarly, while the use of time slotted r.f. data communications is preferred, collision detection might also be used, particularly in a system with a limited number of remote units or server displays.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A service request communications system comprising at least one server unit and a plurality of remote units, each of said remote units comprising:
   a wireless signal transceiver;
   a microcomputer having an "operate" state and a "quiescent" state;
   a plurality of manually actuable switching elements;
   display means;
   a battery for selectively powering said transceiver, said microcomputer and said display means; and
   means responsive to the actuation of any of said switch elements for initiating the application of power from said battery to said transceiver and placing said microcomputer in the "operate" state, said microcomputer having resident software effective upon entering the "operate" state for (1) operating the transceiver to transmit code identifying the particular remote unit and the particular switch element actuated, (2) following such transmission, controlling the transceiver to listen for an acknowledgement code and (3), if a predetermined acknowledgement code is received, energizing said display means to indicate that the request was received by a server unit;

and wherein said server unit comprises:
a wireless signal transceiver;
server display means for identifying remote unit/switch element combinations;
a plurality of manually actuable switch devices, there being at least one switch device for each remote unit for which the server unit is responsible;
a server microcomputer, said server microcomputer having resident software which, (1) controls the server transceiver to listen for code transmitted by said remote units, (2) upon receiving such a code, operates the server display to identify the remote unit/switch element combination and operates the transceiver to transmit a corresponding predetermined acknowledgement code, and (3) upon actuation of a switch device, terminates the respective identifying combination display.

2. A service request communications system comprising a master unit, several server units, and a plurality of remote units, each of said remote units comprising:
a wireless signal transceiver having a transmit data input, a receive data output and a transmit/receive select input;
a microcomputer having an "operate" state and a "quiescent" state;
a plurality of manually actuable switching elements;
display means;
a battery for selectively powering said transceiver, said microcomputer and said display means; and
means responsive to the actuation of any of said switch elements for initiating the application of power from said battery to said transceiver and placing said microcomputer in the "operate" state, said microcomputer having resident software effective upon entering the "operate" state for (1) operating said transceiver to transmit code identifying the particular remote unit and the particular switch element actuated, (2) following such transmission, controlling the transceiver to listen for an acknowledgement code (3), if a predetermined acknowledgement code is received, energizing said display means to indicate that a request was received by a server unit (4) controlling the transceiver to listen for a cancel code and (5), if a predetermined cancel code is received, terminating the request display;
wherein each server unit comprises:
server display means for identifying remote unit/switch element combinations;
a plurality of presettable selector devices which can be set to correspond with respective remote units;
a plurality of manually actuable switch devices, there being at least one switch device for each remote unit for which the server unit is responsible;
a server microcomputer, said server microcomputer having resident software which, (1) monitors data communications from the master unit, (2) upon receiving a code identifying a service request corresponding to a remote unit for which a respective selector has been set, operates the server display to identify the remote unit/switch element combination, and (3) upon actuation of a switch device, terminates the respective identifying combination display;
wherein the master unit comprises:
a wireless signal transceiver;
a master microcomputer, said master microcomputer having resident software which (1) controls the master transceiver to listen for code transmitted by the remote units, (2) upon receiving such a code, issues to said server units a coded communication which identifies the remote unit/switch element combination.

3. A service request communications system comprising a master unit, several server units, and a plurality of remote units, each of said remote units comprising:
a wireless signal transceiver;
a microcomputer having an "operate" state and a "quiescent" state;
a plurality of manually actuable switching elements;
display means;
a battery for selectively powering said transceiver, said microcomputer and said display means; and
means responsive to the actuation of any of said switch elements for initiating the application of power from said battery to said transceiver and placing said microcomputer in the "operate" state, said microcomputer having resident software effective upon entering the "operate" state for (1) operating said transceiver to listen for a predetermined polling code; (2) after receiving such a polling code, transmitting a preselectable time later a request code identifying the particular remote unit and the particular switch element actuated; (3) following such transmission, controlling the transceiver to listen for an acknowledgement code; (4), if the acknowledgement code is received, energizing said display means to indicate that the request was received by a server unit; (5) controlling the transceiver to listen for a cancel code; and (6), if a predetermined cancel code is received, terminating the request display;
wherein each server unit comprises:
server display means for identifying remote unit/switch element combinations;
a plurality of presettable selector devices which can be set to correspond with respective remote units;
a plurality of manually actuable switch devices, there being at least one switch device for each remote unit for which the server unit is responsible;
a server microcomputer, said server microcomputer having resident software which, (1) monitors data communications from the master unit, (2) upon receiving a code identifying a service request corresponding to a remote unit for which a respective selector has been set, operates the server display to identify the remote unit/switch element combination, and (3) upon actuation of a switch device, terminates the respective identifying combination display and transmits a predetermined code communication to the master unit,
wherein the master unit comprises:
a wireless signal transceiver;
a master microcomputer, said master microcomputer having resident software which (1) operates the master transceiver to periodically transmit a predetermined polling code and, following transmission of said polling code, to listen for request code transmitted by the remote units, (2) upon receiving such a request code, issuing to said server units a coded communication which identifies the remote unit/switch element combination; (3) which monitors data communications from the server units; (4) upon receiving from a server unit a predetermined code communication representing a request cancel, operating said transceiver to transmit a cancel code to the remote unit which corresponds to the request.

4. A service request communications system comprising a master unit, several server units, and a plurality of remote units, each of said remote units comprising:
a wireless signal transceiver;
a microcomputer having an "operate" state and a "quiescent" state;
a plurality of manually actuable switching elements;
display means;
a battery for selectively powering said transceiver, said microcomputer and said display means; and
means responsive to the actuation of any of said switch elements for initiating the application of power from said battery to said transceiver and placing said microcomputer in the "operate" state, said microcomputer having resident software effective upon entering the "operate" state for (1) operating said transceiver to listen for a predetermined polling code; (2) after receiving such a polling code, transmitting a preselectable time later a request code identifying the particular remote unit and the particular switch element actuated; (3) following such transmission, controlling the transceiver to listen for an acknowledgement code; (4), if the acknowledgement code is received, energizing said display means to indicate that the request was received by a server unit; (5) controlling the transceiver to listen for a cancel code; and (6), if a predetermined cancel code is received, terminating the request display;
wherein each server unit comprises:
a wireless signal transceiver;
server display means for identifying remote unit/switch element combinations;
a plurality of presettable selector devices which can be set to correspond with respective remote units;
a plurality of manually actuable switch devices, there being at least one switch device for each remote unit for which the server unit is responsible;
a server microcomputer, said server microcomputer having resident software which, (1) operates the server transceiver to monitor data communications from the master unit, (2) upon receiving a code identifying a service request corresponding to a remote unit for which a respective selector has been set, operates the server display to identify the remote unit/switch element combination, and (3) upon actuation of a switch device, terminates the respective identifying combination display and operates the server transceiver to transmit a predetermined code communication to the master unit;
wherein the master unit comprises:
a wireless signal transceiver;
a master microcomputer, said master microcomputer having resident software which (1) operates the master transceiver to periodically transmit a predetermined polling code and, following transmission of said polling code, to listen for request code transmitted by the remote units, (2) upon receiving such a request code, operating the master transceiver to transmit to said server units a coded communication which identifies the remote unit/switch element combination; (3) which monitors data communications from the server units; (4) upon receiving from a server unit a predetermined code communication representing a request cancel, operating said transceiver to transmit a cancel code to the remote unit which corresponds to the request.

* * * * *